June 23, 1953     E. JANOWSKI     2,642,918

JIG

Original Filed Nov. 2, 1948     2 Sheets-Sheet 1

INVENTOR.
Edward Janowski
BY Albert P. Davis
Attorney

June 23, 1953   E. JANOWSKI   2,642,918
JIG
Original Filed Nov. 2, 1948   2 Sheets-Sheet 2

INVENTOR.
Edward Janowski
BY Albert P. Davis
Attorney

Patented June 23, 1953

2,642,918

UNITED STATES PATENT OFFICE 2,642,918

JIG

Edward Janowski, Pawtucket, R. I.

Original application November 2, 1948, Serial No. 57,912. Divided and this application February 23, 1950, Serial No. 145,697

8 Claims. (Cl. 154—1)

My invention relates to an apparatus for manufacturing a plastic Venetian blind ladder tape, and more particularly relates to a jig for holding the ladder rungs of a Venetian blind ladder tape while they are fused or welded to the side tapes, and is a division of my copending application Serial No. 57,912, filed November 2, 1948, now Patent No. 2,620,850, for "Ladder Tape for Venetian Blinds and Method and Apparatus for its Manufacture."

An object of my invention is to provide a jig capable of insulatedly supporting a plastic ladder tape rung on the conveyor portion of an apparatus for manufacturing plastic Venetian blind tape.

Another object of my invention is to provide a jig for holding a rung for a Venetian blind tape and locating it between the side tapes for welding thereto.

Another object of my invention is to provide a jig including supporting cross conducting rods on which the rungs of a Venetian blind tape are mounted and which is adapted to abut the inturned ends of said rungs as they are bent in passing between the side tapes to provide a backing therefor and to provide a greater welding heat than if the current was merely grounded on the inside of the side tapes.

Another object of my invention is to provide a jig for holding a rung of a plastic Venetian blind tape in position while its ends are welded to the side tapes by radio frequency dielectric welding.

Another object of my invention is to provide a jig for use in an apparatus for manufacturing plastic Venetian blind tape.

Another object of my invention is to provide a jig for use in an apparatus for manufacturing plastic Venetian blind tape and which is provided with means to hold it in alignment on a straight run on said apparatus and spaced a predetermined distance from other similar jigs on said apparatus.

Another object of my invention is to provide a jig for use in an apparatus for manufacturing plastic Venetian blind tape having suitable means for automatically clamping the rungs as they are fed into position thereon.

Other objects of the invention will be obvious and will in part appear hereinafter.

The invention accordingly comprises the apparatus possessing the features, properties and the relation of components which are exemplified in the following detailed disclosure, and the scope of the application of which will be indicated in the claims.

For a fuller understanding of the nature and objects of the invention, reference should be had to the following detailed description taken in connection with the accompanying drawing wherein.

The present invention comprises a jig particularly adapted for use in a machine for manufacturing a plastic Venetian blind ladder tape. The jig is preferably provided with two rung holding means that are staggered with respect to each other to permit the attachment of two staggered rungs to the side tapes simultaneously. It will be obvious, however, to those skilled in the art that my jig can be provided with more than two holding means or with only one.

A plurality of my novel jigs are mounted in proper spaced relation to each other on an endless conveyor chain forming a part of an apparatus for manufacturing plastic Venetian blind tape. Inasmuch as all of the jigs employed in said apparatus are identical only one of them will be explained in detail hereinafter.

Figure 1:
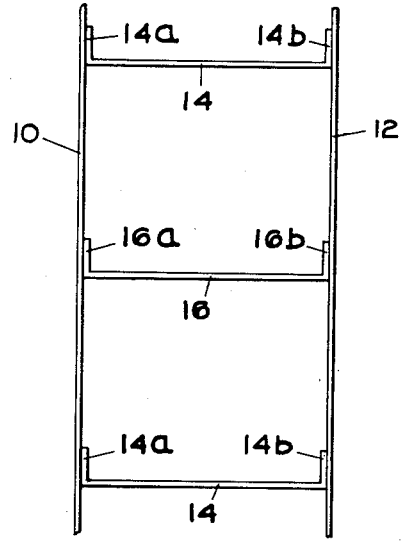
Figure 1 is a side elevation of a plastic Venetian blind ladder tape manufactured by apparatus employing the jig of the present invention.
Figure 2:
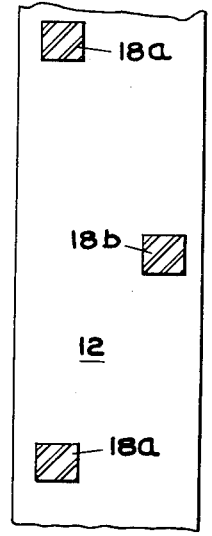
Fig. 2 is an end elevation thereof.
Figure 4:
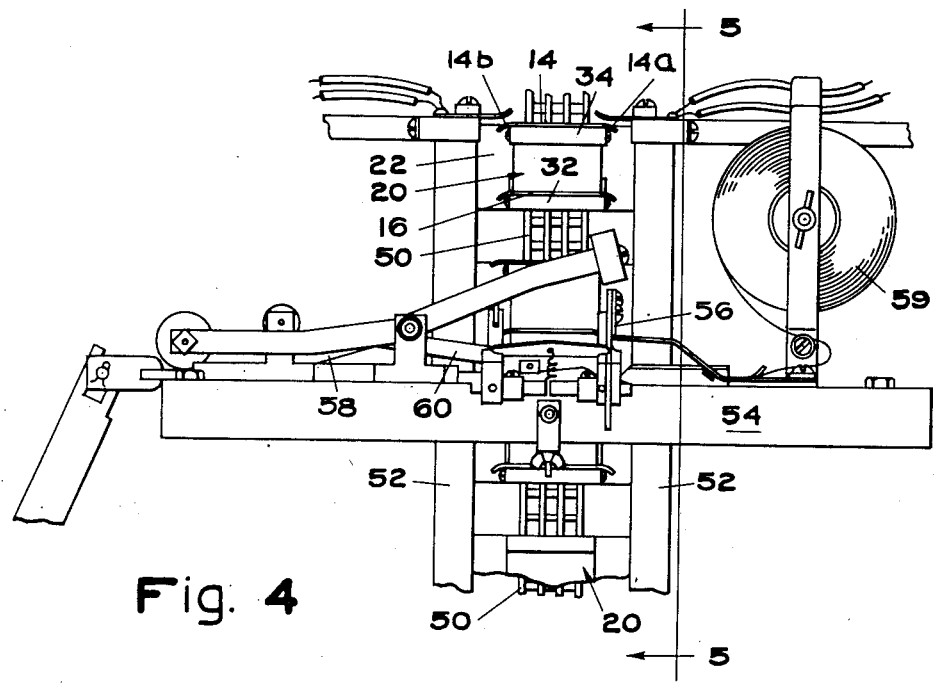
Fig. 4 is a fragmentary rear elevation of an apparatus for manufacturing plastic Venetian blind tape showing the rung feeding mechanism thereof positioning a plastic rung in one portion of the improved jig of the present invention.

Figures 1 and 2 are side and end elevations respectively of a plastic Venetian blind ladder tape manufactured by an apparatus, described and claimed in my above mentioned copending application Serial No. 57,912, and employing a plurality of my novel jigs. The ladder tape comprises two spaced parallel tapes 10 and 12 of plastic material that are joined by rungs 14 and 16 also of plastic material. Rungs 14 and 16 are alternately staggered from each other to provide two aligned rows of rungs, one on each side of the tapes 10 and 12.

Rungs 14 and 16 and parallel tapes 10 and 12 are formed from a heat sealable thermoplastic or synthetic resin. Rungs 14 and 16 have their ends 14a and 14b and 16a and 16b respectively bent at right angles thereto and in the same direction, i. e. both ends of each rung are bent so that they extend on the same side of the rung. The bent ends 14a and 14b of rung 14 and 16a and 16b of rung 16 are fused or welded to their respective tape 10 or 12 by the welds 18a and 18b.

The jig 20 of the present invention is particularly adapted to grasp rungs 14 and 16 as they are cut to proper length in a continuous process machine, transport them from the location where they were cut and grasped to a location where the bent ends 14a, 14b, 16a and 16b are to be welded to side tapes 10 and 12, holding said rungs in position while said welding takes place, and following said welding moving the length of completed ladder tape out of the welding station and moving a subsequent length of side tapes 10 and 12 into welding position.

The jig 20 comprises the generally rectangular flat base plate 22 having side edges 24. One end of an insulating block 26 is attached to the center of plate 22 and projects therefrom. The other end of block 26 has a relatively short rung holding arm 28, and relatively long rung holding arm 30 extending therefrom. The difference in length between arms 28 and 30 is equal to the distance that it is desired to stagger rungs 14 from rungs 16. Said arms 28 and 30 are spaced vertically from each other a distance equal to the distance between adjacent rungs 14 and 16.

Conducting cross bars or rung holders 32 and 34, preferably of rectangular shape as shown, are mounted on the ends of arms 28 and 30 respectively. Bars 32 and 34 are of a length equal to the desired spacing between parallel tapes 10 and 12, and slightly longer than the width of arms 28 and 30 so that their ends extend beyond arms 28 and 30 an appreciable distance to provide a clamping surface against which rungs 14 and 16 can be held. Pairs of finger clamps 36 and 38 are provided to clamp each end of a cut rung of greater length than said bars 32 and 34 to the leading edges of said bars, so that the ends thereof project substantially equal amounts therefrom.

Finger clamps 36 and 38 are elongated levers pivoted adjacent their mid-point on the sides of arms 28 and 30 respectively by means of studs 40 and 42 so that their clamping or holding ends extend over and are adapted to abut the end portions of bars 32 and 34 which extend beyond arms 28 and 30. Spring means 44 comprising coil springs connect the other end of finger clamp 36 to a bell crank like extension on finger clamp 38 to urge their clamping ends towards bars 32 and 34. The ends of finger clamps 36 and 38 opposite their holding or clamping ends are provided with laterally extending pins 46 and 48 respectively.

A plurality of my novel jigs 20 are attached to an endless conveyor chain 50, forming a part of the Venetian blind manufacturing apparatus, by welding or otherwise attaching base plate 22 thereto. The jigs are spaced apart a distance such that arms 30 and 28 of adjacent jigs are spaced from each other a distance equal to the spacing between adjacent ladder rungs 14 and 16. Side edges 24 of base plate 22 are adapted to engage grooves or tracks formed by vertical side bars 52 to maintain the jigs in alignment.

The apparatus which preferably employs my novel jig is provided with two jig loading stations spaced vertically from each other, one for loading relatively short arms 28 and the second for loading relatively long arms 30. Inasmuch as both loading stations are substantially identical, and inasmuch as they are explained in detail in my above mentioned copending application Serial No. 57,912, only one is disclosed herein and only so much of it as is necessary to an understanding of the operation of my novel jig will be described herein.

Each jig loading means comprises a transverse base plate 54 having a central opening of substantially the width of jig cross bars 32 and 34 to permit the jigs to pass therethrough. A knife slot and pivotal knife blade 56 are located on said base plate 54 adjacent one side of said opening. A spool of rung tape 59 is suitably mounted on base plate 54 and the tape is suitably guided from said spool and under said knife 56. The other side of base plate 54 is provided with means for grasping the end of the rung tape after it has been cut by knife 56 and drawing another length thereof across the opening in said base plate 54. The means for so grasping and drawing the rung tape comprises a reciprocating slide 58 having a clamping lever 60 pivotally mounted thereon. Slide 58 is reciprocated back and forth across the opening in base plate 54. Suitable linkages cause clamping lever 60 to grip the end of the rung tape between it and the end of slide 58 to draw said tape across said opening. Another linkage functions to pivot knife 56 to cut the tape after a predetermined length thereof has been drawn across said opening.

The jig loading means and conveyor chain 50 operate intermittently and alternatively, i. e. first the loading means draws a length of tape from spool 59 and cuts it, then conveyor chain 50 advances one increment to cause arm 34 of one jig and arm 32 of another jig to pick up their respective rungs 14 and 16. The movement of chain 50 also advances a third jig into position to have the rungs carried thereby welded to side tapes 10 and 12.

A pair of cams 62 are mounted on side bars 52 adjacent each loading station. Cams 62 are so positioned that they will be engaged by pins 46 and 48 as the jigs approach base plate 54 to pivot one pair of finger clamps 36 or 38 open on each of the two jigs to be loaded. Cams 62 hold their respective fingers open until bars 32 and 34 have come up under and contacted the piece of tape to be carried thereby, at which time pins 46 and 48 pass beyond said cams and springs 44 move said fingers to clamp the tape on bars 32 and 34. Cams 62 which actuate fingers 38 are provided with a channel 64 through which pin 46 on finger 36 passes to prevent said fingers 36 from being opened to release rungs 16 from bar 32 as the jig approaches the second loading position to pick up rung 14 on bar 34.

Figure 6:
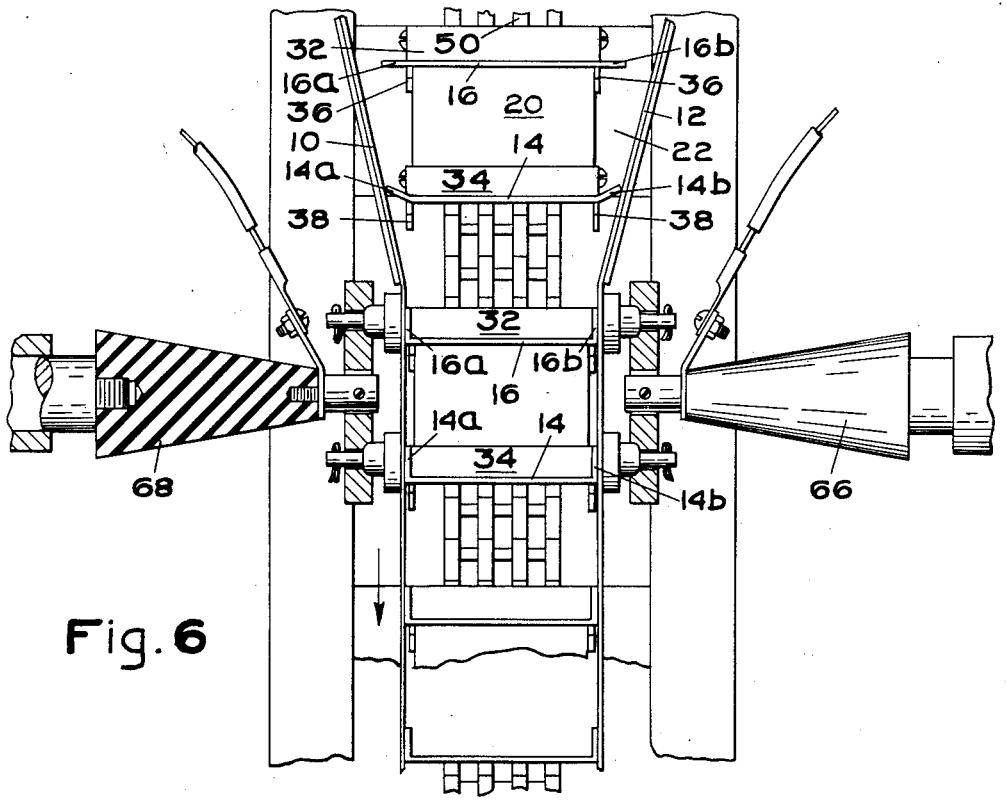
Fig. 6 is a fragmentary front elevation of a portion of the apparatus showing the jig of the present invention holding a pair of rungs while they are welded to the ladder side tapes.
Figure 3:
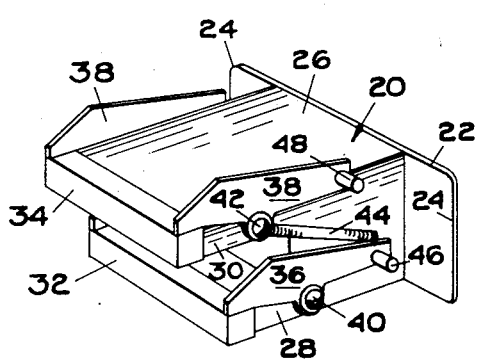
Fig. 3 is a perspective view of the improved jig.
Figure 5:
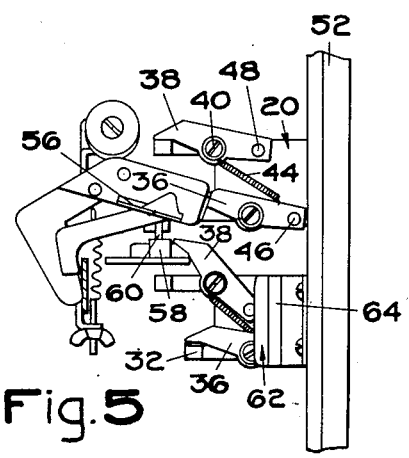
Fig. 5 is a fragmentary side elevation, taken on the line 5—5 of Fig. 4, and showing the jig attached to the conveyor of the apparatus and passing by the rung feeding mechanism.

As stated above, each movement of conveyor chain 50 also moves a third jig 20, loaded with rungs 14 and 16 into position to hold said rungs while they are welded to side tapes 10 and 12. As jigs 20 are advanced step by step by chain 50 they pass between converging side tapes 10 and 12 (Fig. 6) to have the ends 14a, 14b, 16a and 16b of rungs 14 and 16 folded back against the ends of their bars 32 or 34. When a jig 20 reaches the welding position the rung ends are against side tapes 10 and 12 and are being held there by bars 32 and 34. At this time welding electrodes 66 and 68, described in detail and claimed in my copending application Serial No. 145,696, now Patent No. 2,552,431, move towards each other to contact side tapes 10 and 12 opposite rung ends 14a, 14b, 16a and 16b to apply a radio frequency current thereto to weld said ends to said side tapes.

The completed ladder tape is stripped from jigs 20 subsequent to the welding operation by a mechanism not pertinent to the present invention or necessary to an understanding of its mode of operation.

Since certain changes may be made in the above apparatus without departing from the scope of the invention herein involved, it is intended that all matter contained in the above description or shown in the accompanying drawing shall be interpreted as illustrative and not in a limiting sense.

What is claimed is:

1. A jig adapted to hold a plurality of strips of thermoplastic material intermediate their ends in position for welding the ends thereof to two spaced strips of thermoplastic material comprising in combination a base plate, an insulating block projecting from one face of said base plate, fixed spaced arms projecting from said block, a conducting cross bar mounted on each arm, each of said cross bars being shorter than said first mentioned strips, a plurality of clamping fingers, means pivoting said fingers intermediate their ends to said arms for pivotal movement towards and away from said bars, means normally urging one end of each of said fingers towards said bars, and means carried by the other end of said fingers for pivoting said fingers away from said bars, whereby said fingers can be pivoted in one direction to permit one of said first mentioned strips to be located on each of said bars whereupon release of said last mentioned means permits said fingers to hold them thereon.

2. A jig comprising a base plate, a plurality of fixed spaced insulating arms projecting from said base plate, a conducting cross bar mounted on each arm, a plurality of clamping fingers, means pivoting said fingers intermediate their ends to said arms for pivotal movement towards and away from said bars, means normally urging one end of each of said fingers towards one of said bars, whereby a strip of material can be mounted intermediate its ends on each of said bars and retained thereon by said fingers, and means associated with the other end of said fingers and adapted to pivot them away from said bars.

3. A jig comprising a base plate, a plurality of fixed spaced insulating arms projecting from said base plate, a conducting cross bar mounted on each arm, each cross bar being of greater length than the width of the arm it is mounted on whereby the ends of each bar project beyond the sides of the arm it is mounted on, a clamping finger pivotally mounted on each side of each arm for pivotal movement towards and away from its adjacent projecting bar end, and means resiliently urging said fingers towards said bar ends, whereby strips of material can be positioned longitudinally of said bars and held thereon intermediate their ends by said fingers.

4. A jig comprising a base plate, a plurality of fixed spaced insulating arms projecting from said base plate, a conducting cross bar mounted across the end of each arm, each cross bar being of greater length than the width of its respective arm whereby the ends of each bar project beyond the sides of the arm it is mounted on, a clamping finger pivotally mounted intermediate its ends on each side of each arm for pivotal movement towards and way from its adjacent projecting bar end, means resiliently urging one end of each of said fingers towards said bar ends, and means carried by the other end of each of said fingers for pivoting them away from said bar ends, whereby strips of material can be positioned longitudinally of said bars without interference from said fingers and subsequently be held thereon by said fingers.

5. A jig comprising a generally rectangular base plate having side edges adapted to engage and be moved along parallel track members, a plurality of fixed spaced insulating arms projecting from said base plate, a conducting cross bar mounted across the end of each arm, each cross bar being of greater length than the width of its respective arm whereby the ends of each bar project beyond the sides of the arm it is mounted on, a clamping finger pivotally mounted on each side of each arm for pivotal movement towards and away from its adjacent projecting bar end, means resiliently urging said fingers towards said bar ends, and means carried by each of said fingers and adapted to engage fixed cam surfaces on said track members as said jig is moved therealong to pivot said fingers away from said bar ends.

6. A jig comprising a generally rectangular base plate having side edges adapted to engage and be moved along parallel track members, a plurality of fixed spaced insulating arms projecting from said base plate, a conducting cross bar mounted across the end of each arm, each cross bar being of greater length than the width of its respective arm whereby the ends of each bar project beyond the sides of the arm it is mounted on, a clamping finger pivotally mounted intermediate its ends on each side of each arm for pivotal movement towards and away from its adjacent projecting bar end, means resiliently urging one end of each of said fingers towards said bar ends, and means carried by the other end of each of said fingers and adapted to engage fixed cam surfaces on said track members as said jig is moved therealong to pivot said fingers away from said bar ends.

7. A jig comprising a base plate, a plurality of fixed spaced arms projecting from said base plate, a cross bar mounted on each arm, a plurality of clamping fingers, means pivoting said fingers intermediate their ends to said arms for pivotal movement towards and away from said bars, means normally urging one end of each of said fingers towards one of said bars, whereby a strip of material can be mounted intermediate its ends on each of said bars and retained thereon by said fingers, and means associated with the other end of said fingers and adapted to pivot them away from said bars.

8. A jig comprising a base plate, a plurality of fixed spaced arms projecting from said base plate, a cross bar having a length greater than the width of said arms mounted on each arm with its ends projecting beyond said arms, a plurality of clamping fingers, means pivoting said fingers intermediate their ends to said arms for pivotal movement towards and away from the projecting ends of said bars, means normally urging one end of each of said fingers towards the projecting ends of said bars, whereby a strip of material can be mounted intermediate its ends on each of said bars and retained thereon by said fingers, and means associated with the other end of said fingers and adapted to pivot them away from said bars.

EDWARD JANOWSKI.

References Cited in the file of this patent

UNITED STATES PATENTS

| Number | Name | Date |
|---|---|---|
| 2,330,446 | Piazze | Sept. 28, 1943 |
| 2,457,659 | Graham | Dec. 28, 1948 |
| 2,492,530 | Kreigsheim | Dec. 27, 1949 |
| 2,527,627 | Frankel et al. | Oct. 31, 1950 |